United States Patent
Rosen et al.

(10) Patent No.: US 12,045,919 B2
(45) Date of Patent: Jul. 23, 2024

(54) SYSTEMS AND PROCESSES FOR MULTI-DIRECTIONAL CONNECTION OF DIRECTED ACYCLIC GRAPHS BETWEEN DASHBOARDING TOOLS AND EXTERNAL DATA TOOLS

(71) Applicant: Snyk Limited, Berkshire (GB)

(72) Inventors: Joshua Rosen, Holden, MA (US); Seth Rosen, Melrose, MA (US)

(73) Assignee: Snyk Limited, Berkshire (GB)

( * ) Notice: Subject to any disclaimer, the term of this patent is extended or adjusted under 35 U.S.C. 154(b) by 0 days.

(21) Appl. No.: 17/530,684

(22) Filed: Nov. 19, 2021

(65) Prior Publication Data

US 2023/0162415 A1 May 25, 2023

(51) Int. Cl.
| | | |
|---|---|---|
| *G06T 11/20* | (2006.01) | |
| *G06F 16/2455* | (2019.01) | |
| *G06F 16/248* | (2019.01) | |
| *G06F 16/901* | (2019.01) | |
| *G06F 16/903* | (2019.01) | |

(52) U.S. Cl.
CPC .......... *G06T 11/206* (2013.01); *G06F 16/248* (2019.01); *G06F 16/9024* (2019.01); *G06F 16/90335* (2019.01); *G06F 16/24568* (2019.01)

(58) Field of Classification Search
None
See application file for complete search history.

(56) References Cited

U.S. PATENT DOCUMENTS

| 8,766,980 B2 * | 7/2014 | Miyashita | G06T 11/206 |
| | | | 345/441 |
| 2013/0173667 A1 | 7/2013 | Soderberg et al. | |

(Continued)

FOREIGN PATENT DOCUMENTS

WO   2023/089076 A1   5/2023

OTHER PUBLICATIONS

Zhaosen Wang, Jean Honorio, "Reconstructing a Bounded-Degree Directed Tree Using Path Queries," 2019, 57 Annual Allerton Conference on Communication, Control, and Computing, pp. 506-513 (Year: 2019).*

(Continued)

*Primary Examiner* — Michael J Cobb
(74) *Attorney, Agent, or Firm* — Hamilton, Brook, Smith & Reynolds, P.C.

(57) ABSTRACT

Systems and processes are provided for dashboarding tools with multi-directional connection of directed acyclic graphs. The systems and processes presented comprise hardware architecture, computer-implemented processes, and instructions configured to carry out the processes for dashboarding tools with multi-directional connection of directed acyclic graphs, wherein the multi-directional connection is between dashboarding tools and external data tools. A user may use the systems and processes to create, view, and share data analytics with other users, drawing upon multiple external and internal directed acyclic graphs or other data models or external data sources with data lineage preserved. The present disclosure solves problems with the currently available systems and processes of data analytics, DAGs, data models, and visualization of data analytics.

14 Claims, 6 Drawing Sheets

(56) References Cited

U.S. PATENT DOCUMENTS

| | | | |
|---|---|---|---|
| 2014/0267287 A1* | 9/2014 | Dodgen | G06F 3/048 |
| | | | 345/440 |
| 2016/0357496 A1* | 12/2016 | Thimbleby | G06F 3/1423 |
| 2018/0136798 A1* | 5/2018 | Aggour | H04L 43/045 |
| 2019/0147084 A1* | 5/2019 | Pal | G06F 40/205 |
| | | | 707/769 |
| 2019/0155853 A1* | 5/2019 | Caudy | G06F 16/2365 |
| 2020/0050612 A1 | 2/2020 | Bhattacharjee et al. | |
| 2022/0179911 A1* | 6/2022 | Caudy | G06F 16/21 |
| 2024/0022398 A1* | 1/2024 | Chapple | H04L 9/0852 |

OTHER PUBLICATIONS

IBM, "What is Data Lineage," 2022, retrieved from "https://www.ibm.com/topics/data-lineage" (Year: 2022).*

Deephaven, "Deephaven's Directed-Acyclic-Graph (DAG)", 2023, retrieved from "https://deephaven.io/core/docs/conceptual/dag/" (Year: 2023).*

Hazelcast, "Directed Acyclic Graph (DAG)," 2023, retrieved from "https://hazelcast.com/glossary/directed-acyclic-graph/" (Year: 2023).*

June Casagrande, "A Word Please: A Simple Rule for Nouns that are Singular or Plural at the Same Time", 2022, Opinion, LA Times retrieved from "https://www.latimes.com/socal/daily-pilot/opinion/story/2022-05-23/a-word-please-conjugating-nouns-that-are-singular-and-plural-at-the-same-time" (Year: 2022).*

International Search Report and Written Opinion received for PCT Patent Application No. PCT/EP2022/082358, mailed on Mar. 1, 2023, 15 pages.

* cited by examiner

SYSTEMS AND PROCESSES FOR MULTI-DIRECTIONAL CONNECTION OF DIRECTED ACYCLIC GRAPHS BETWEEN DASHBOARDING TOOLS AND EXTERNAL DATA TOOLS

FIELD OF THE INVENTION

The present disclosure relates generally to data analytics and presentation tools, and more specifically, to dashboarding tools built on directed acyclic graphs, for presentation and analysis and transformations of curated data in directed acyclic graphs as dashboards.

BACKGROUND OF THE INVENTION

Dashboarding tools allow users and to create and view a range of data, and allow for stock and/or customized visualization of data and analytics. Data engineering tools, which may be referred to as tools for data transformation and/or data automation, including directed acyclic graphs are known and used for, among other things, modeling relationships between tables of data in a data-warehouse to automate joining of data. Modeling data and changes to data as a directed acyclic graph is known in the art, to show the order of steps in loading and transforming data, and to show which steps must happen prior to other steps.

Dashboarding tools do not exist that allow connections or extensions of existing directed acyclic graphs, to be used for customized data analytics and/or customized data analytics output, where customized data analytics output can include but is not limited to a defined or changeable set of data and data visualizations that a user can add to a dashboard or use to create a dashboard. Dashboarding tools do not exist that allow use of one or more existing directed acyclic graphs to establish a data model, and allow a user or users to establish a new directed acyclic graph or directed acyclic graphs, connected to the existing directed acyclic graphs (DAGs) at external data engineering tools, to be used for customized data analytics and/or customized data analytics output. The present art does not allow for presentation and analysis of curated upstream data models with directed acyclic graphs, regardless of the type of upstream DET or the type of upstream data models, that connect to directed acyclic graph(s) external to the curated data models and DAGs. The external data engineering tool or tools (DET or DETs) have a DAG, termed an external DAG, to represent and perform a specified set of transformations on data. The DET connects to a data store or other data source, being a location or storage of data including but not limited to a database or a data warehouse, and the DET transforms a plurality of data stores or data sources into a data model through a set of transformations. The set of transformations is organized as a DAG. The data store or other data source may be stored at or with the external data engineering tool, or that data may be in a data store, data source, data warehouse, or other location, collectively referred to herein as a "data source" having a plurality of data, which may be stored with or built with or in the DET, or which may be external to the DET. The DET performs a set of transformations on the data to produce a data model that lives in a data store. Those steps in the set of transformations are described in and by the external DAG or external DAGs. The present disclosure presents a dashboarding tool with a DAG, termed an internal DAG, which may comprise original data sources, and the present disclosure teaches connecting the external DAG(s) and the internal DAG. In this context, "curated" means "selected," in that at present, the known art does not allow a user or users to select from any of a range of data stores, import or access data from them in a manner that preserves dependencies, maintain a data connection with the range of data stores, and present data from them in a user-customizable manner for customized data analytics and/or customized data analytics output. An external DAG or upstream DAG represents or transforms data and is upstream of the desired location or instance of the customized data analytics. An external DAG may be referred to as an "upstream data representation" and/or an "upstream data transformation". The combination of the external DAGs and the internal DAG is a combined flow in dependency order of the combined set of transformations that must be applied to the data from the data's raw form to the data's presentation on a dashboard page. The external DAGs and the internal DAG may refer to data models that are stored in external data sources somewhere. By maintaining the data lineage and transformation lineage from DET and the external DAGs to the dashboarding tool and the internal DAG, the present application allows tracking of data lineage end-to-end, and allows developers to optimize the steps for performance, and to understand the impact of problems or changes in the external DAGs or DET on the dashboarding tool and the downstream data transformations represented in the internal DAG.

SUMMARY OF THE INVENTION

The present disclosure meets all these needs, by disclosing systems, and processes, methods, and computer-readable instructions stored in non-transitory computer-readable media operable by one or more computing systems, for dashboarding tools built on directed acyclic graphs (DAG or DAGs), with multi-directional connection of directed acyclic graphs, for presentation and analysis of curated transformations of data stores in one or more directed acyclic graphs, wherein the multi-directional connection is between dashboarding tools and external data tools.

The present disclosure addresses the problems of the prior art by presenting systems and processes and computer-readable instructions for customized data analytics and/or customized data analytics output, by allowing connections or extensions of existing directed acyclic graphs in customized or curated directed acyclic graphs. The present disclosure also provides for use of one or more existing directed acyclic graphs to establish a DAG, and allow a user or users to establish a new directed acyclic graph or directed acyclic graphs, connected to the existing directed acyclic graphs, to be used for customized data analytics and/or customized data analytics output.

The present disclosure allows a user or users to build a DAG in a system with a dashboarding tool, with the ability to connect to an external DAG, which external DAG is part of a third-party DET (a software tool or other third-party offering, external to the system of the present disclosure); the third-party DET may be referred to as "upstream" or as an "upstream DET". The present disclosure can display analytics output in a dashboard. The dashboarding tool of the present disclosure can then maintain and display and analyze the data lineage from each data store or sources, such as a third-party data store, through the external DET and external DAG, all the way to the dashboard and the user role or persona accessing the dashboard. By modeling the data flow and dependencies within the dashboarding tool as an internal DAG in such a way that it is compatible and interoperable with a third-party DET, the dashboarding tool of the present disclosure can display all of the plurality of data, or any selected portions of the plurality of data, where the plurality of data is linked to or accessible by the internal DAG and the third-party DET including any external DAGs. Modeling the data flow and dependencies as an internal DAG within the dashboarding tool can allow the internal DAG to be exported to any third-party DET, and used outside of the dashboarding tool.

Using the dashboarding tool of the present disclosure, a data engineer or user can browse a third-party DET with external DAG(s), and select a plurality of reference points, or a plurality of dependencies, between the external DAG(s) and an internal DAG. Any queries built in the dashboarding tool may contain references or links to any external DAGs.

For the system 100 to be able to operate with a plurality of third-party DAGs 900, in the various systems and methods described herein the format of the plurality of third-party DAGs 900 must be known to the system 100, and must be a format that can be used and implemented by the system 100, as further described herein.

The dashboarding tool of the present disclosure can assess at the compile time or time of display of a dashboard whether any references or dependencies on any third-party DAGs have been met or broken, by using the internal DAG, the reference points, and the third-party DAG. The dashboarding tool of the present disclosure can then generate and display or report, to a data engineer or a user, any build errors or runtime errors based on the reference points connecting the internal DAG to the third-party DAG. This is beneficial because it reduces the possibility of dashboarding tool breakage or failure, by informing a dashboard data engineer of changes or broken reference points that may impact their dashboards. By having the reference points assessed at compile time, with data dependencies declared up-front, the incidence of run-time errors is greatly reduced, making the dashboarding tools of the present disclosure less error-prone and therefore better for users and a technical improvement over the prior art.

The dashboarding tool of the present disclosure provides another benefit to data engineers or analytics engineers and, broadly, owners or operators, collectively referred to as external data engineers, of any third-party DAGs, broadly any system of transformations or automation steps that depend on each other, that may be used or connected to by the system, because the dashboarding tool can inform external data engineers of how changes they may make to third-party data models, third-party data stores, third-party data sources, third-party data warehouses, or third-party DAGs may affect or break dashboards built with the dashboarding tool of the present disclosure. The present disclosure provides additional benefits to data engineers and to external data engineers by assisting them in understanding which types of users make use of which types of data and DAGs. A further benefit of the present disclosure is in making data dependencies on upstream third-party DAGs explicit.

The present disclosure provides multiple specific performance improvements over the prior art, including but not limited to identifying inefficiencies in the execution order of queries and redundancy in query execution. By identifying this, a user can structure their query logic in a more modular way, to reduce redundancy and ensure optimal execution order, lowering processing power and time required. Additionally, the present disclosure allows a user and the system to shift queries from being performed at runtime by the dashboarding tool on every dashboard page load, to being done beforehand by a data transformation tool as part of a data transformation batch process. This improves the performance of dashboards by reducing the page load times and ensuring that expensive computational queries are offloaded from the dashboarding tool. By providing end-to-end lineage of data, a user and the system can independently test, measure, and improve the performance of each ancestral query in a DAG, and can also use that information to determine performance bottlenecks and distinguish between non-optimal data transformation versus non-optimal runtime queries. All of the foregoing offer performance improvements over the prior art.

In one aspect, the present disclosure comprises a system for dashboarding tools with multi-directional connection of directed acyclic graphs, the system comprising: an internal DAG, comprising a plurality of queries, a plurality of dependencies, a plurality of data flow; a set of user-information on a plurality of users comprising at least a user; a dashboarding tool, which maintains and displays and analyzes a data lineage; a dashboard display; and wherein the system connects to a plurality of third-party DAGs which are distributed among a plurality of external data engineering tools; and wherein the internal DAG can connect with and remain connected with the plurality of third-party DAGs allowing updates from the third-party DAG to the internal DAG, and requests from the internal DAG to the third-party DAG; and wherein the dashboarding tool can display all of a plurality of data, or any selected portions of the plurality of data, that is moved, flowed, transformed, manipulated by, accessible by, or linked to the internal DAG and/or the third-party DAG.

In one aspect, the present disclosure comprises a system for dashboarding tools, wherein the system can cause the plurality of external data engineering tools to create or add to the plurality of third-party DAGs.

In one aspect, the present disclosure comprises a system for dashboarding tools, wherein the system uses the plurality of queries and the plurality of dependencies to create the internal DAG.

In one aspect, the present disclosure comprises a system for dashboarding tools, wherein the internal DAG comprises at least a first internal DAG and a second internal DAG.

In one aspect, the present disclosure comprises a system for dashboarding tools, wherein a user may build the internal DAG, or cause the system to build the internal DAG, through use of the dashboarding tool; and wherein the user can see the internal DAG.

In one aspect, the present disclosure comprises a system for dashboarding tools, wherein the system and the internal DAG can identify inefficiencies in an execution order of the plurality of queries and redundancy in a query execution, before the plurality of queries is executed in the query execution.

In one aspect, the present disclosure comprises a system for dashboarding tools, wherein the user may create any of a plurality of dependencies, which comprise connections between data, to be used by the system to create customized data analytics output.

In one aspect, the present disclosure comprises a system for dashboarding tools, wherein the system can process or compute the plurality of queries before compile-time or runtime by the dashboarding tool on a dashboard display page load; and wherein the plurality of queries may be processed by one or more of the plurality of external data engineering tools as part of a data transformation batch process.

In one aspect, the present disclosure comprises a system for dashboarding tools, wherein the dashboarding tool provides a mechanism for exporting a plurality of queries for inclusion into the third-party DAG.

In one aspect, the present disclosure comprises a system for dashboarding tools, wherein the internal DAG can be exported to any third-party DAG.

In one aspect, the present disclosure comprises a system for dashboarding tools, wherein using the dashboarding tool, a user can browse a third-party DAG, and select a plurality of dependencies between the third-party DAG and an internal DAG, and the user may build any of the plurality of queries in the dashboarding tool which contain a plurality of dependencies to any third-party DAG.

In one aspect, the present disclosure comprises a system for dashboarding tools, wherein the dashboarding tool can assess whether any of the plurality of dependencies on any third-party DAGs have been met or broken, by using the internal DAG, the plurality of dependencies, and the third-party DAG; and wherein the dashboarding tool can thereafter generate and display a plurality of errors.

In one aspect, the present disclosure comprises a system for dashboarding tools, wherein the dashboarding tool can inform a user of changes to third-party DAGs that affect or break the dashboard display.

In one aspect, the present disclosure comprises a system for dashboarding tools, wherein the system further comprises a plurality of modules, which comprise a DAG connector module, a DAG browser module, a query builder module, a query linker module, a lineage visualizer module, and a DAG exporter module, and wherein the DAG exporter module exports the internal DAG in a native manner or format to the external data engineering tools, so that the internal DAG and the data contained in it may be used with any third-party DAG.

In one aspect, the present disclosure comprises a system for dashboarding tools, wherein a third-party DAG may be imported by the DAG connector module to create, or to add to, an internal DAG.

In one aspect, the present disclosure comprises a system for dashboarding tools, wherein the internal DAG may be exported by the DAG exporter module to create one or more new third-party DAGs.

In one aspect, the present disclosure comprises a system for dashboarding tools, wherein the internal DAG is connected to a third-party DAG with a plurality of reference points, and the user adds the plurality of reference points, or any subset of the plurality of reference points, at any time.

In one aspect, the present disclosure comprises a process, stored in non-transitory computer-readable media, for dashboarding tools with multi-directional connection of directed acyclic graphs, the process comprising: a dashboarding tool communicates with an internal DAG to gather a plurality of dependencies; the dashboarding tool utilizes a set of user-information about at least a user; the user creates additional data dependencies in the plurality of dependencies; and the user selects and views a plurality of the data from the internal DAG; thereafter, the dashboarding tool generates a view of the plurality of data, and displays that view to a dashboard display.

In one aspect, the present disclosure comprises a process, stored in non-transitory computer-readable media, for dashboarding tools, wherein the user iterates to select a different plurality of data from the internal DAG, and the dashboarding tool again generates a view of the plurality of data, and again displays that view to the dashboard display.

In one aspect, the present disclosure comprises a process, stored in non-transitory computer-readable media, for dashboarding tools, wherein: the dashboarding tool builds a plurality of queries of the internal DAG; the dashboarding tool receives lineage visualizer information from the internal DAG, and may make the lineage visualizer information available to the dashboard display; and the dashboarding tool receives error information about the plurality of errors.

In one aspect, the present disclosure comprises a process, stored in non-transitory computer-readable media, for dashboarding tools, wherein the process utilizes a DAG connector module, a DAG browser module, a query builder module, a query linker module, a lineage visualizer module, and a DAG exporter module, and wherein the DAG connector module imports a third-party DAG to create an internal DAG and/or imports any portion of a third-party DAG as updates to supplement an internal DAG.

In one aspect, the present disclosure comprises a process, stored in non-transitory computer-readable media, for dashboarding tools, wherein the DAG connector module maintains an active data connection between the internal DAG and any of a plurality of third-party DAGs.

In one aspect, the present disclosure comprises a process, stored in non-transitory computer-readable media, for dashboarding tools, wherein the dashboarding tool accepts a plurality of information from the internal DAG to the DAG exporter module, and the dashboarding tool exports the plurality of information to the third-party DAG, and the process exports data to any of the plurality of third-party DAGs, and the export of data can create one or more new DAGs.

In one aspect, the present disclosure comprises a process, stored in non-transitory computer-readable media, for dashboarding tools, wherein the dashboarding tool communicates with the internal DAG, which implements the DAG browser module; and wherein the dashboarding tool utilizes the set of user-information.

In one aspect, the present disclosure comprises a process, stored in non-transitory computer-readable media, for dashboarding tools, wherein the user creates additional data dependencies in the plurality of dependencies, which implements the query builder module and/or the query linker module.

In one aspect, the present disclosure comprises a process, stored in non-transitory computer-readable media, for dashboarding tools, wherein the user selects and views a plurality of the data from the internal DAG, which may be implemented using the query builder module.

In one aspect, the present disclosure comprises a process, stored in non-transitory computer-readable media, for dashboarding tools, wherein the dashboarding tool generates a view of the plurality of data, which may be implemented using the lineage visualizer module.

In one aspect, the present disclosure comprises a process, stored in non-transitory computer-readable media, for dashboarding tools, wherein the dashboarding tool builds a plurality of queries, implementing the query builder module, and the dashboarding tool receives lineage visualizer information from the internal DAG, utilizing the lineage visualizer module, and the dashboarding tool receives error information utilizing the lineage visualizer module.

These aspects of the present invention, and others disclosed in the Detailed Description of the Drawings, represent improvements on the current art. This summary is provided to introduce a selection of concepts in a simplified form that are further described below in the Detailed Description of the Drawings. This Summary is not intended to identify key features or essential features of the claimed subject matter, nor is it intended to be used to limit the scope of the claimed subject matter. The terms "approximate" or "approximately" and similar conjugates mean, for purposes of this disclosure, values within 10% of each other or within 10% of a specified value or end-values of a range of values. The singular and plural are interchangeable and a term in the singular includes the plural, or vice-versa, unless such reading is contradicted by the context. Unless otherwise noted, the terms "process" and "method" are equivalent in meaning and may be used interchangeably. Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

BRIEF DESCRIPTION OF THE DRAWINGS

The foregoing summary, as well as the following detailed description of various aspects, is better understood when read in conjunction with the appended drawings. For the purposes of illustration, the drawings show exemplary aspects; but the presently disclosed subject matter is not limited to the specific processes and instrumentalities disclosed. In the drawings, like reference characters generally refer to the same components, or steps of the processes or methods, throughout the different figures. In the following detailed description, various aspects of the present disclosure are described with reference to the following drawings, in which.

DETAILED DESCRIPTION OF THE DRAWINGS

The presently disclosure is described with specificity to meet statutory requirements. But, the description itself is not intended to limit the scope of this patent. Rather, the claimed disclosure might also be configured in other ways, to include different steps or elements similar to the ones described in this document, in conjunction with other present or future technologies. Moreover, although the term "step" or similar terms may be used herein to connote different aspects of processes employed, the term should not be interpreted as implying any particular order among or between various steps herein disclosed unless and except when the order of individual steps is explicitly described.

In the following description, numerous specific details are set forth to provide a thorough understanding of the invention. But, the present disclosure may be practiced without these specific details. Structures and techniques that would be known to one of ordinary skill in the art have not been shown in detail, in order not to obscure the invention. Referring to the figures, it is possible to see the various major elements constituting the apparatus and processes of use of the present invention.

The present disclosure comprises a system 100, a process 300, and computer readable instructions 400 stored in non-transitory computer-readable media, for dashboarding tools with multi-directional connection of directed acyclic graphs, wherein the multi-directional connection may be between dashboarding tools and external data tools. For the system 100 to connect to a plurality of third-party DAGs 900, the specification of the plurality of third-party DAGs 900 must be documented in some manner, including but not limited to being open source.

Figure 1:
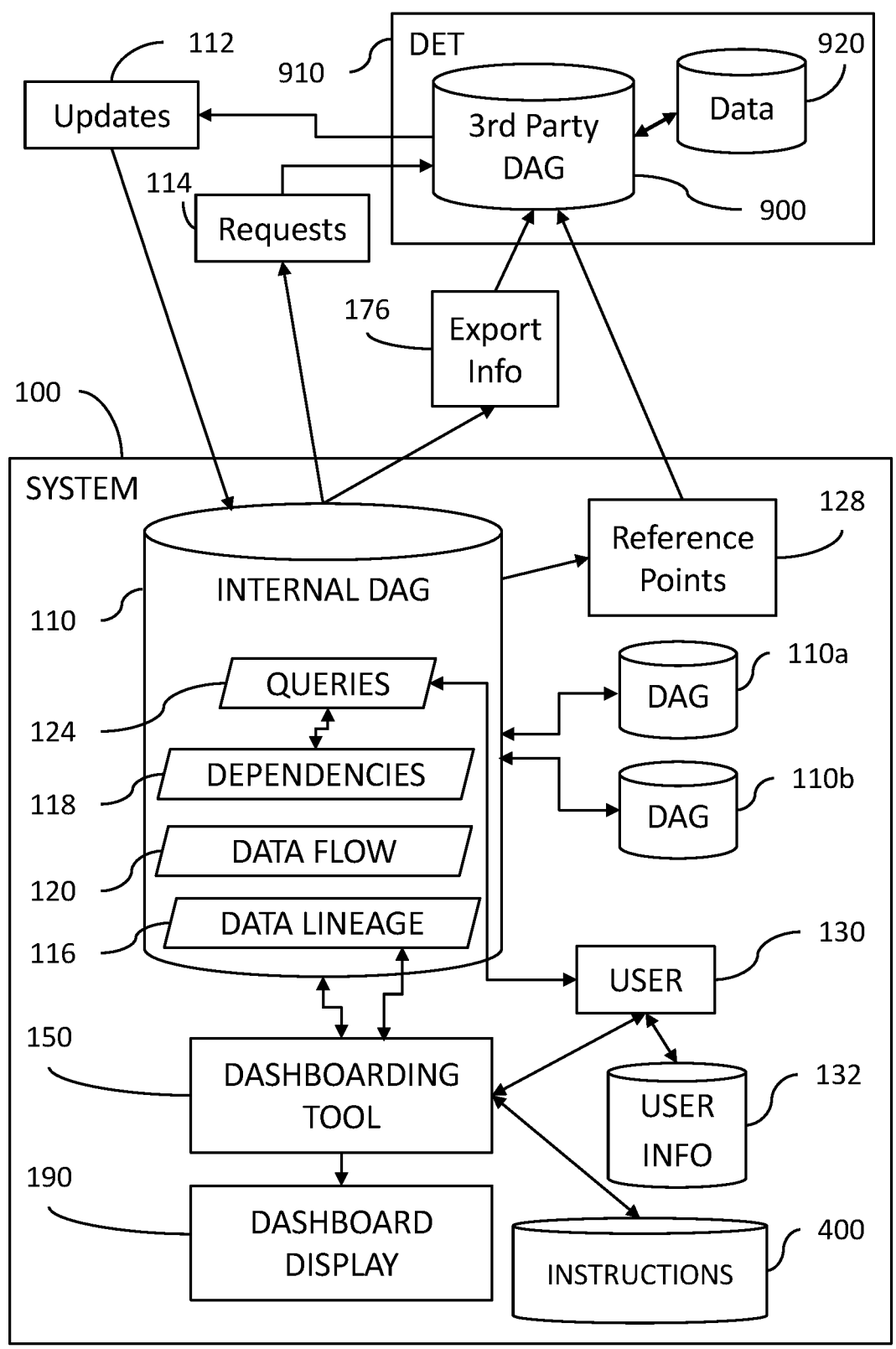
FIG. 1 illustrates an example network and computer environment for a system for dashboarding tools with multi-directional connection of directed acyclic graphs according to an embodiment of the present disclosure.

With reference to FIG. 1, an example network and computer environment for dashboarding tools with multi-directional connection of DAGs is shown. A system 100 connects to one or more existing DAGs that are outside the system 100, referred to as a plurality of third-party DAGs 900, where the plurality of third-party DAGs 900 is part of a plurality of external data engineering tools 910, such that the plurality of third-party DAGs 900 may be distributed among any number of a plurality of external data engineering tools 910. The system 100 establishes a DAG, and allows a user 130 or a plurality of users 130 to establish a new DAG or DAGs, as a user 130 writes a plurality of queries 124 or code, which can be in SQL or any other computer code or language. The plurality of queries 124 written by the user create a plurality of dependencies 118 by defining references between smaller pieces of code and/or disparate data items. The system 100 uses the plurality of queries 124 and the plurality of dependencies 118 created by the user 130 to create an internal DAG 110. The system can display the internal DAG 110 to the user 130. The system 100 can cause the plurality of external data engineering tools 910 to create or add to the plurality of third-party DAGs 900. The internal DAG 110 can connect with and remain connected with the plurality of third-party DAGs 900. The internal DAG 110 may advantageously model dashboard pages and the plurality of queries 124, and refer to the plurality of dependencies 118 that depend on or from a third-party DAG 900, or in some aspects of the present disclosure are part of a third-party DAG 900, and which new DAG(s) model the foregoing data and data relationships as an interconnected DAG. The new DAG(s) is or are collectively referred to as an internal DAG 110, comprised in the system 100. The internal DAG 110 may, it has been found advantageous in some aspects of the present disclosure, comprise at least two internal DAGs: a first internal DAG 110*a* for data analytics and establishing a DAG by a data engineer user or similar user, and a second internal DAG 110*b* for business analysis, intended for business users, though open to any users. It will be apparent to one of skill in the art that there may be any number of internal DAGs created, and that they may be used for or by all users, or for or by any purposes. It will be apparent to one of skill in the art that the internal DAG 110 may comprise any number of DAGs.

The internal DAG 110 is communicably connected to the plurality of third-party DAGs 900, with the connection allowing updates 112 from the third-party DAG 900 to the internal DAG 110, and requests 114 from the internal DAG 110 to the third-party DAG 900. The internal DAG 110 may be used for customized data analytics and/or customized data analytics output, as a dashboard. The system 100 comprises a set of user-information 132 on a user 130 or a plurality of users 130, including but not limited to information on roles that each user 130 has within the system 100.

The system 100 comprises a dashboarding tool 150 and a dashboard display 190. A user 130 may build the internal DAG 110, or cause the system 100 to build the internal DAG 110, through use of the dashboarding tool 150, and thus cause or instruct the system 100 and the dashboarding tool 150 to display analytics output in the dashboard display 190, in what is referred to generally as a dashboard. It has been found advantageous to have the user 130 be aware or have awareness of the internal DAG 110—accordingly, the user 130 can see and understand how their actions change or modify the internal DAG 110 as the user 130 changes data dependencies and data relationships. The system 100 builds the internal DAG 110, at the direction of the user 130 to make, compute, or display selected data analytics, or visualizations of data analytics, in the dashboard.

By modeling the internals of the dashboarding tool 150 as the internal DAG 110, and, more specifically by surfacing the internal DAG 110 so that a user 130 who is developing or helping to create the dashboard and a dashboard display 190 can see the internal DAG 110, the system 100 allows the user 130 to identify performance bottlenecks in the query (or queries, individually or collectively referred to as a plurality of queries 124, whether written in SQL or any other code or language) execution underlying a dashboard page, which is part of the dashboard display 190 created and displayed as part of the dashboarding tool 150. This offers specific performance improvements over the prior art because the system 100 and the internal DAG 110 can identify inefficiencies in an execution order of the plurality of queries 124 and redundancy in a query execution 126, before the plurality of queries 124 is executed in the query execution 126. In this way, the system 100 of the present disclosure provides actionable information that a dashboard developer or any user 130 can use to refactor the logic underlying the plurality of queries 124, also referred to as the query logic, to reduce redundancy and ensure optimal execution order, such as by writing and executing the plurality of queries 124 in a more logical, more efficient, and/or more modular manner. The user 130 may create any of a plurality of dependencies 118, which comprise connections between data, to be used by the system 100 to create customized data analytics output. The system 100 uses the plurality of dependencies 118 to assemble and also to refine the internal DAG 110. The plurality of dependencies 118 are nodes of the internal DAG 110, creating manipulations (e.g., query, filter, and transform) of data, among the data comprising the internal DAG 110 and/or data in a third-party DAG 900. The plurality of dependencies 118 are steps in a workflow, instructing the system 100 to acquire data or other input from, for instance, any third-party DAG 900. The plurality of dependencies 118 allow filtering of data, and may be connections between data, between workflow steps, and/or both. The plurality of dependencies 118 combine the plurality of queries 124 and user input. The plurality of dependencies 118 may be conceived of as layers, with a layer comprising steps in a dataflow or workflow. Any or each step in the dataflow can be "materialized," meaning it exists in the dataflow to arrive at the next step of the dataflow or at the end of the dataflow.

This approach of the present disclosure presents performance optimizations over the prior art. One such performance optimization of the present disclosure from connecting an internal DAG 110 of a dashboarding tool 150 to a third-party DAG 900 that is part of one of the plurality of external data engineering tools 910 arises because the system 100 can shift a plurality of queries 124 from being processed at compile-time or runtime by the dashboarding tool 150 on a dashboard display 190 page load to the plurality of queries 124 being processed or computed before compile-time or runtime. The plurality of queries 124 may be processed by one or more of the plurality of external data engineering tools 910 as part of a data transformation batch process. The foregoing improves the performance of a dashboarding tool 150 by reducing the page load times of the dashboard display 190, and by offloading computationally expensive (in terms of computer power and time) queries 124 from the dashboarding tool 150 to the plurality of external data engineering tools 910. By having the internal DAG 110 connected to a third-party DAG 900, the system 100 can determine which of the plurality of queries 124 could benefit most from being done "upstream" in the plurality of external data engineering tools 910. The dashboarding tool 150 can also provide a mechanism for automatically exporting a plurality of queries 124 for inclusion into the third-party DAG 900 that will then be referenced by the internal DAG 110 rather than queried directly by the dashboarding tool 150.

The dashboarding tool 150 can maintain and display and analyze a data lineage 116, being a plurality of information on the data from each third-party DAG 900, including any DAG or DAGs, comprising information on the data and linkages from the third-party DAG 900 to the internal DAG 110, the dashboarding tool 150, and the dashboard display 190. The internal DAG 110 further comprises data that are a plurality of dependencies 118 of the data within the internal DAG 110 on the third-party DAG 900 and on other data within the internal DAG 110. The plurality of dependencies 118 may also be referred to as links, linkages, connections, reference points, references, data dependencies, or similar terms when referring to connections or interconnections among a plurality of data 920. The system 100 further comprises a plurality of data flow 120, being the movement or flow or transformation or manipulation of a plurality of data 920 within the system 100, including internal movement of the plurality of data 920, and also updates 112 and requests 114. By modeling the updates 112, the requests 114, the plurality of dependencies 118, and the plurality of data flow 120 within the system 100 as the internal DAG 110 in such a way that the internal DAG 110 is compatible and interoperable with the third-party DAG 900, the dashboarding tool 150 of the present disclosure can display all of the plurality of data 920, or any selected portions of the plurality of data 920, that is moved, flowed, transformed, manipulated by, accessible by, or linked to the internal DAG 110 and/or by the third-party DAG 900. Modeling the plurality of data flow 120 and the plurality of dependencies 118 as an internal DAG 110 within and/or for the dashboarding tool 150 can allow the internal DAG 110 to be exported to any third-party DAG 900 of any format, or to any external data engineering tools 910, and used outside of the dashboarding tool 150, as described further herein.

The system 100, by providing the data lineage 116 starting with sources managed by or used as sources by the plurality of external data engineering tools 910 at one end to the dashboarding tool 150 at the other end, and all transformations, layers, steps, and data sources in between the plurality of external data engineering tools 910 and the dashboarding tool 150, provides for total visibility into all the transformations and steps that the data has undergone before being displayed on a dashboard display 190. At each transformation or step in the internal DAG 110 and/or the third-party DAG 900, being connected to each other, it is possible to independently test, measure, and improve the performance of each ancestral query from the plurality of queries 124 in an internal DAG 110 and/or a third-party DAG 900. The system 100 also makes possible a determination or performance bottlenecks, and allows the system 100, and a user 130 of the system 100, to distinguish between non-optimal data transformation versus non-optimal runtime queries. The foregoing offer performance improvements and improvements in computational power and efficiency over the prior art.

Therefore, the system 100 presents a data visualization tool that maintains connections to DAGs, such as the third-party DAG 900, in a curated and organized format, presenting data analytics from one or more data warehouses, which may comprise one or more third-party DAGs 900. The dashboard display 190 displays the analysis, in a manner or manners that the system prescribes for each user 130, and which may depend on the type of role or roles that the user 130 has.

Using the dashboarding tool 150 of the present disclosure, a user 130 can browse a third-party DAG 900, and select a plurality of dependencies 118 between the third-party DAG 900 and an internal DAG 110. Any of the plurality of queries 124 built in the dashboarding tool 150 may contain a plurality of dependencies 118 to any third-party DAG 900.

The dashboarding tool 150 can assess, at the compile time, and/or runtime, and/or time of display of a dashboard to the dashboard display 190, or at any other time, whether any of the plurality of dependencies 118 on any third-party DAGs 900 have been met or broken, by using the internal DAG 110, the plurality of dependencies 118, and the third-party DAG 900. The dashboarding tool 150 can thereafter generate and display, to a user 130, a plurality of errors 152, including but not limited to build errors or runtime errors, based on the plurality of dependencies 118 connecting the internal DAG 110 to the third-party DAG 900. This is beneficial because it reduces the possibility of dashboarding tool 150 breakage or failure, by informing a user 130 of the dashboarding tool 150 of changes or breaks in the plurality of dependencies 118 that may impact the dashboard display 190.

The dashboarding tool 150 of the present disclosure provides another benefit to data engineers and operators of any third-party DAGs 900, referred to as external data engineers, that may be used or connected to by the system 100, because the dashboarding tool 150 can inform a user 130, including but not limited to external data engineers, of how changes that external data engineers may make to third-party DAGs 900 may affect or break any dashboard display 190 built with the dashboarding tool 150. The system 100 provides additional benefits to certain of the plurality of users 130 by assisting them in understanding which of the plurality of users 130 make use of which types of data and DAGs, which may encompass different types of users, from internal DAG 110, third-party DAG 900, comprising any number of sources. A further benefit of the present disclosure is in making data dependencies among the plurality of dependencies 118 on upstream third-party DAGs 900 explicit.

Figure 2:
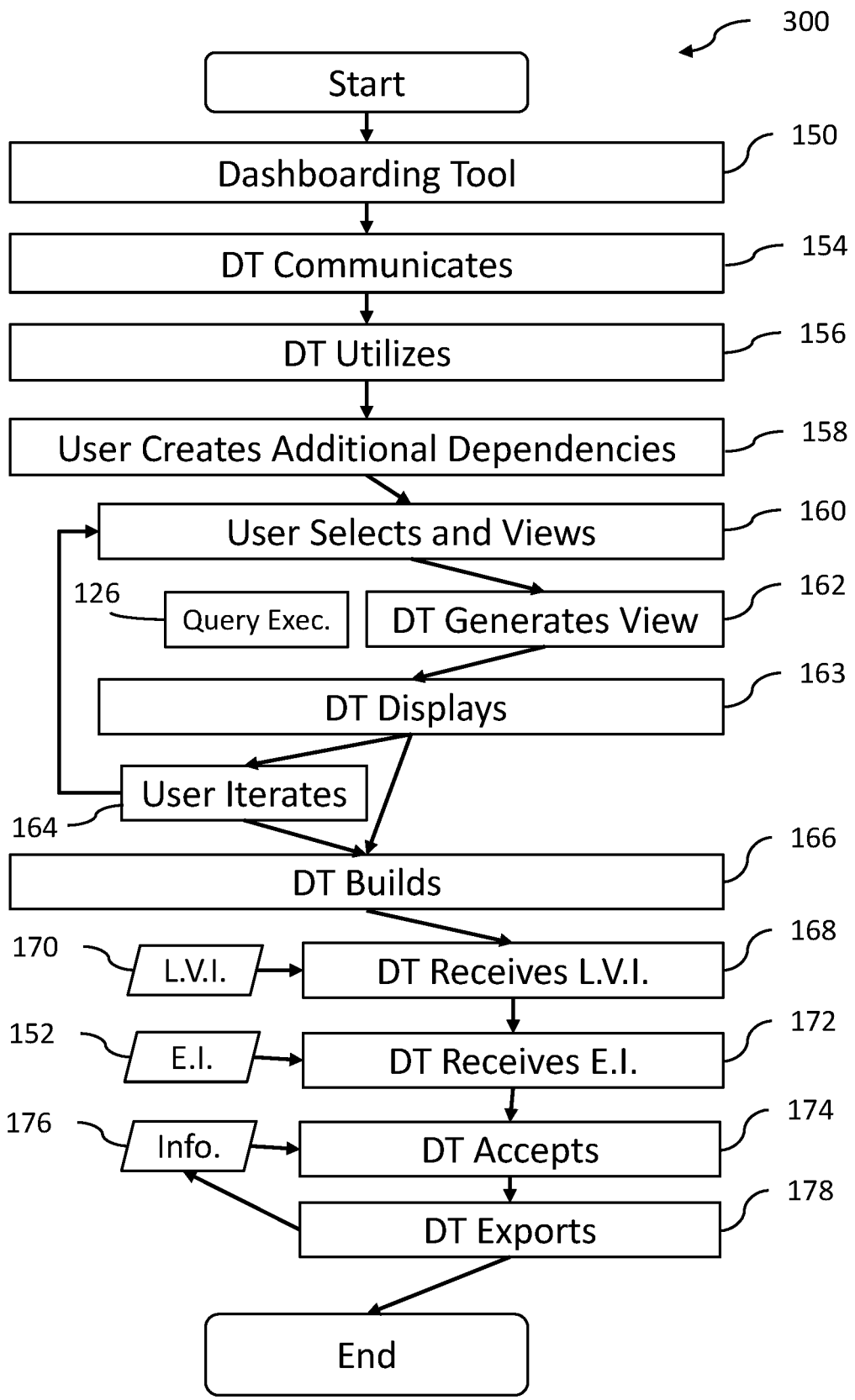
FIG. 2 illustrates a flow diagram of an exemplary process for dashboarding tools with multi-directional connection of directed acyclic graphs according to an embodiment of the present disclosure.

With reference to FIG. 2, a flow diagram is shown of a process 300 for a system 100 for dashboarding tools with multi-directional connection of directed acyclic graphs, the process 300 comprising multi-directional connection of directed acyclic graphs. The dashboarding tool 150 communicates 154 with the internal DAG 110, or in aspects of the present disclosure with a plurality of internal DAG 110 comprising more than one, with at least the first internal DAG 110a and the second internal DAG 110b, to gather the plurality of dependencies 118. The dashboarding tool 150 utilizes 156 the set of user-information 132 to be able to incorporate information about the user 130 using the dashboarding tool 150. In some aspects of the present disclosure, the user 130 creates 158 additional data dependencies in the plurality of dependencies 118. The user 130 selects 160 and views a plurality of the data from the internal DAG 110. Thereafter, the dashboarding tool 150 generates 162 a view of the plurality of data, such as by implementing the query execution 126, and displays 163 that view to the dashboard display 190. The user 130 iterates 164 to select a different plurality of data from the internal DAG 110, and the dashboarding tool 150 again generates 162 a view of the plurality of data, and again displays 163 that view to the dashboard display 190.

Thereafter, the dashboarding tool 150 builds 166 a plurality of queries 124, of the internal DAG 110 or any number of the internal DAG 110. The dashboarding tool 150 receives 168 lineage visualizer information 170 from the internal DAG 110, and may make the lineage visualizer information 170 available to the dashboard display 190 for display to the user 130. The dashboarding tool 150 receives 172 error information about the plurality of errors 152, as part of the lineage visualizer information 170 in some aspects of the present disclosure; alternatively, the plurality of errors 152 may be separate from the lineage visualizer information 170.

The dashboarding tool 150 accepts 174 a plurality of information 176 from the internal DAG 110 to a DAG exporter module 260, and the dashboarding tool 150 can thereafter export 178 the plurality of information 176 to the third-party DAG 900.

Figure 3:
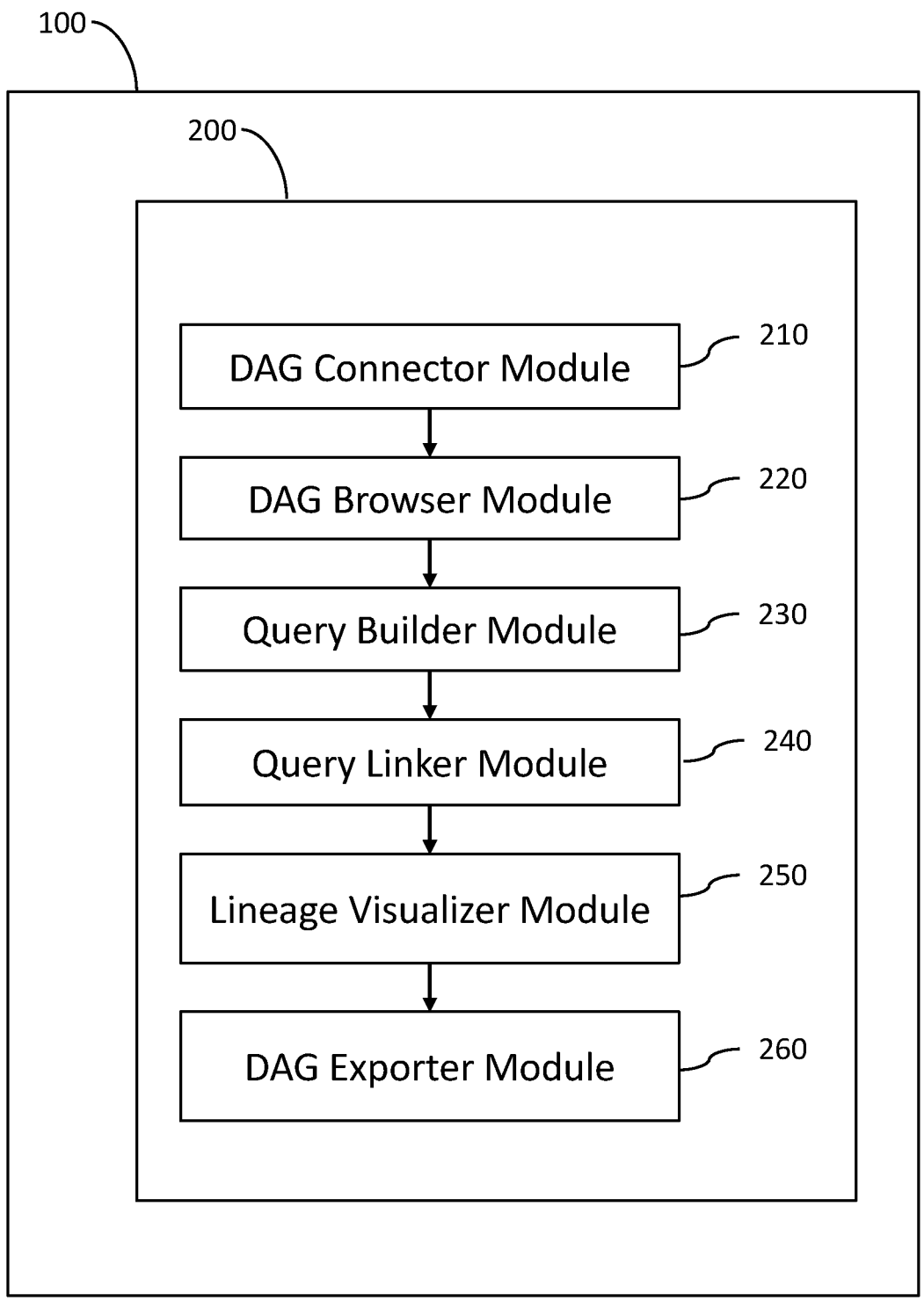
FIG. 3 illustrates an example module flow diagram of a system and a process for multi-directional connection of directed acyclic graphs according to an embodiment of the present disclosure.

With reference to FIG. 3, an example module flow diagram of a system 100 and process 300 for multi-directional connection of directed acyclic graphs according to an embodiment of the present disclosure is shown. The system 100 comprises a plurality of modules 200. The plurality of modules 200 comprises a DAG connector module 210, a DAG browser module 220, a query builder module 230, a query linker module 240, a lineage visualizer module 250, and a DAG exporter module 260. The plurality of modules 200 may be comprised or located in one or more locations within the system 100. It may be advantageous to have one or more of the plurality of modules 200 implemented within the dashboarding tool 150. In some aspects of the present disclosure, the DAG connector module 210 may be implemented within the system 100 external to the dashboarding tool 150. In some aspects of the present disclosure, the DAG exporter module 260 may be implemented within the system 100 external to the dashboarding tool 150 or may be implemented internal to the dashboarding tool 150. In some aspects of the present disclosure, the DAG browser module 220, the query builder module 230, the query linker module 240, and the lineage visualizer module 250 may be implemented within the dashboarding tool 150, such that the dashboarding tool 150 comprises the DAG browser module 220, the query builder module 230, the query linker module 240, and the lineage visualizer module 250.

With reference to FIG. 2, FIG. 3, FIG. 4, FIG. 5, and FIG. 6, the DAG exporter module 260 may export 178 the internal DAG 110 in a native manner or format to the external data engineering tools 910 or a third-party software platform, so that the internal DAG 110 and the data contained in it may be used with any third-party DAG 900. In such an instance, the internal DAG 110 may be incorporated into and/or be an extension of the third-party DAG 900, with the data, the plurality of queries 124, the plurality of dependencies 118, the plurality of data flow 120, and the plurality of data lineage 116 in a native format for the third-party DAG 900 so that the internal DAG 110 become an extension or an integral part of the third-party DAG 900. The internal DAG 110 may be exported by the DAG exporter module 260 to the third-party DAG 900 from which data was imported, and/or to one or more of a plurality of third-party DAGs 900 that does not include the third-party DAG 900 from which data was imported.

Figure 5:
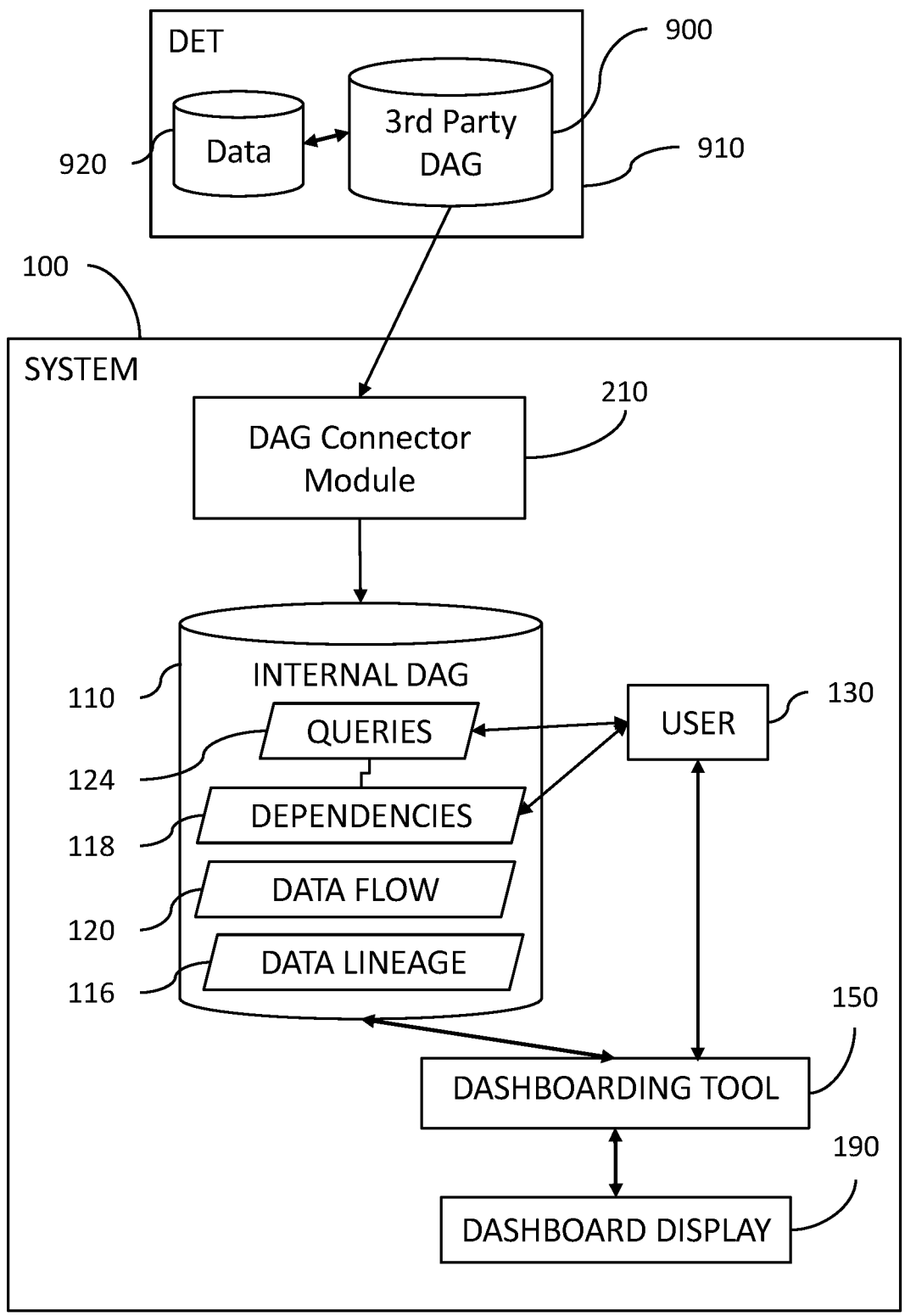
FIG. 5 illustrates an example system and module flow diagram of a system and a process for import of directed acyclic graphs according to an embodiment of the present disclosure.

With particular reference to FIG. 5, a third-party DAG 900 may be imported by the DAG connector module 210 to create, or to add to, an internal DAG 110. The DAG connector module 210 may be used to import any or all of the third-party DAG 900 to create or add to the internal DAG 110. The third-party DAG 900 may continue to be referred to by the system 100 after the foregoing import, or the third-party DAG 900 may be not referred to again after the foregoing import.

Figure 6:
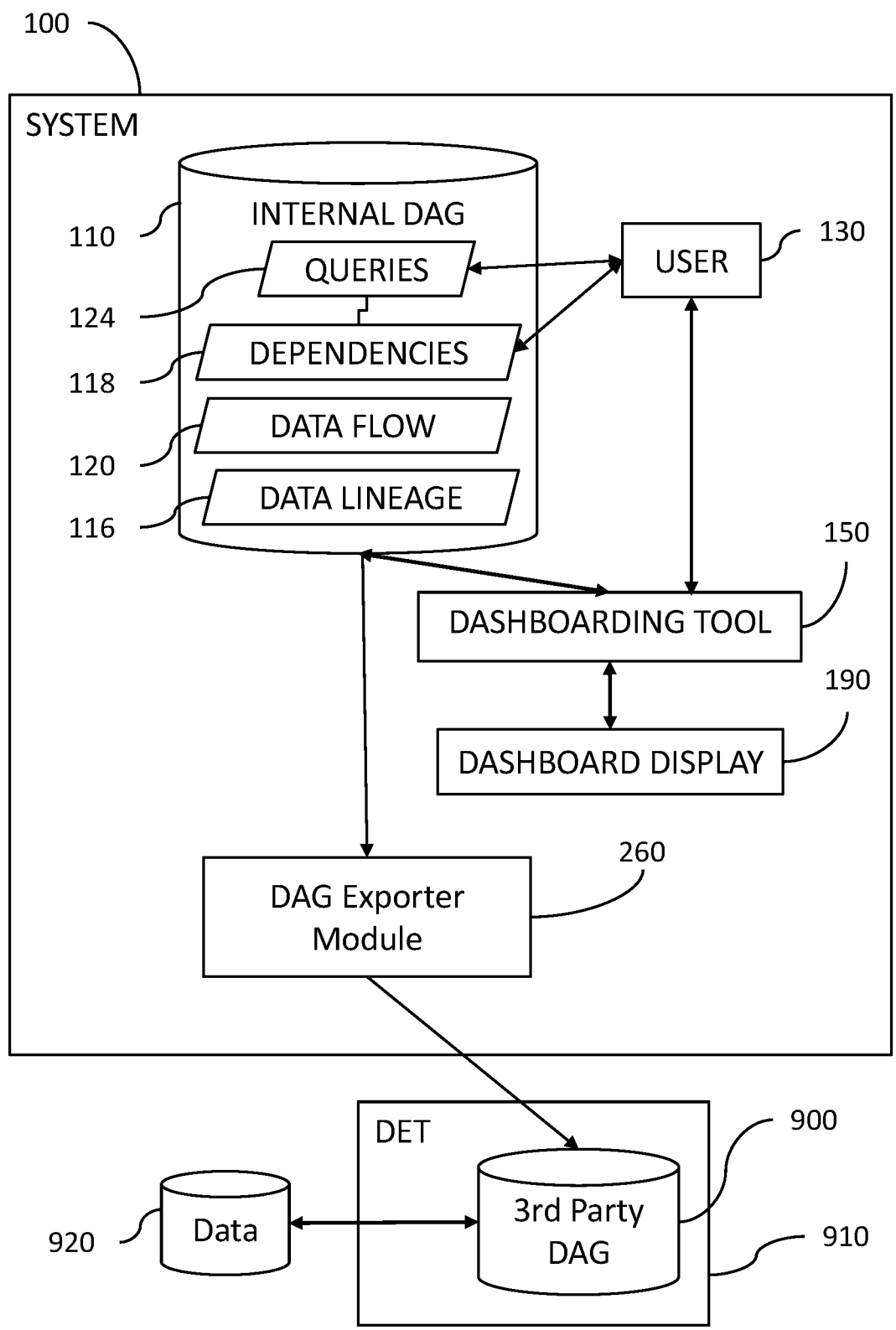
FIG. 6 illustrates an example system and module flow diagram of a system and a process for export of directed acyclic graphs according to an embodiment of the present disclosure.

With particular reference to FIG. 6, the internal DAG 110 may be exported by the DAG exporter module 260 to create one or more new third-party DAGs 900. The DAG exporter module 260 may be used to export 178 any or all of the internal DAG 110 to create a new third-party DAG 900, or to add to a third-party DAG 900, or the DAG exporter module 260 may not be used and the internal DAG 110 may not be exported.

Figure 4:
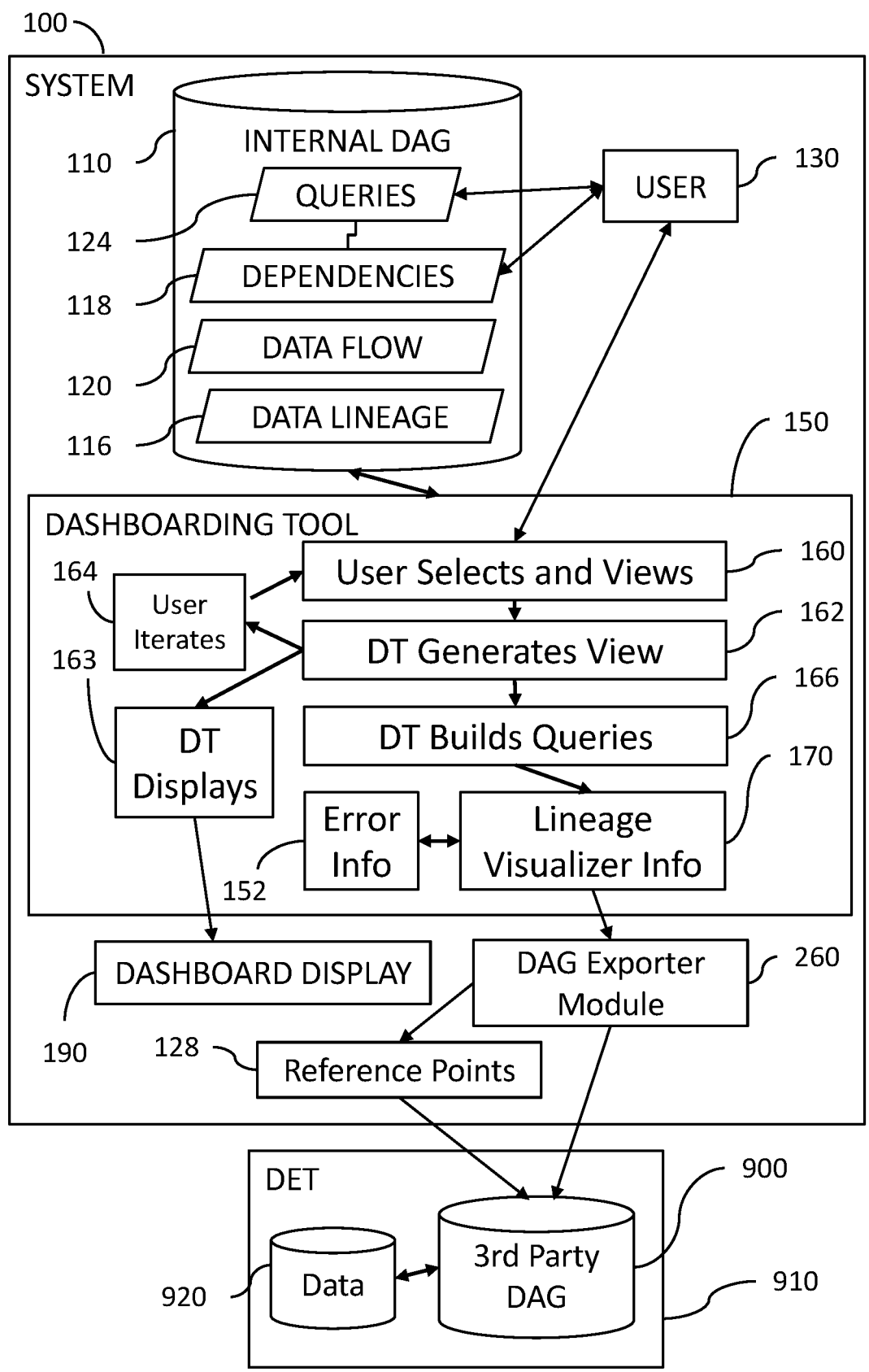
FIG. 4 depicts an exemplary system and data-flow process for dashboarding tools with multi-directional connection of directed acyclic graphs according to an aspect of the present disclosure.

With further reference to FIG. 1 and FIG. 4, the internal DAG 110 can be connected to a third-party DAG 900 or any third-party DAG 900 with a plurality of reference points 128. The user 130 may add the plurality of reference points 128 at a time, or any subset of the plurality of reference points 128, and the plurality of reference points 128 can be to any number of locations within each third-party DAG 900, or within multiple third-party DAGs 900. As any DAG, including but not limited to the internal DAG 110 and the third-party DAG 900, comprises a plurality of references in a dependency graph, the system 100 allows the internal DAG 110 to extend outside of the boundaries of the dashboarding tool 150 through the plurality of reference points 128 to a plurality of third-party DAGs 900.

With reference to FIG. 3 and FIG. 1, the DAG connector module 210 may import a third-party DAG 900, or more than one such third-party DAG 900, which may be any third-party DAG 900, to create an internal DAG 110. The DAG connector module 210 may import any portion of a third-party DAG 900 as updates 112 to supplement an internal DAG 110, wherein the system 100 builds a plurality of queries 124 and combines the third-party DAG 900 with the internal DAG 110. It will be apparent to one of skill in the art that more than one third-party DAG 900 may be imported to create and/or to supplement an internal DAG 110. The DAG connector module 210 may be used to maintain an active data connection between an internal DAG 110 and any of a plurality of third-party DAGs 900, and/or between an internal DAG 110 and any of the external data engineering tools 910, by dynamically and/or frequently importing data from any of the plurality of third-party DAGs 900. The DAG connector module 210 may send requests 114 from the system 100 to the external data engineering tools 910 and the plurality of third-party DAG 900.

The DAG connector module 210 and the DAG exporter module 260 may be separate modules. In some aspects of the present disclosure, the DAG connector module 210 and the DAG exporter module 260 may be implemented as a single module. The system 100 and the process 300 may be implemented to export 178 data to any of a plurality of third-party DAGs 900—this can be the same and/or different third-party DAGs 900 than that from which information was imported as updates 112, and in addition the export 178 of data can be used to create one or more new DAGs as a subset of the plurality of third-party DAGs 900. The system 100 and the process 300 do not necessarily have to be implemented to export 178 data to any of the plurality of third-party DAGs 900.

The dashboarding tool 150 communicates 154 with the internal DAG 110, which may implement the DAG browser module 220. The dashboarding tool 150 utilizes 156 the set of user-information 132 to be able to incorporate information about the user 130 using the dashboarding tool 150, which may implement the DAG browser module 220. In some aspects of the present disclosure, the user 130 creates 158 additional data dependencies in the plurality of dependencies 118, which may be implemented using the query builder module 230 and/or the query linker module 240. In some aspects of the present disclosure, the user 130 selects 160 and views a plurality of the data from the internal DAG 110, which may be implemented using the query builder module 230. In some aspects of the present disclosure, the dashboarding tool 150 generates 162 a view of the plurality of data, which may be implemented using the lineage visualizer module 250.

Implementing the query builder module 230, the dashboarding tool 150 builds 166 the plurality of queries 124. The dashboarding tool 150 receives 168 lineage visualizer information 170 from the internal DAG 110, utilizing the lineage visualizer module 250. The dashboarding tool 150 receives 172 error information utilizing the lineage visualizer module 250.

The various modules and/or functions described above may be implemented by computer-executable instructions, such as program modules, executed by a conventional computer. Generally, program modules include routines, programs, objects, components, data structures, etc. that perform particular tasks or implement particular abstract data types. Those skilled in the art will appreciate that the disclosure may be practiced with various computer system configurations, including hand-held wireless devices such as mobile phones or PDAs, multiprocessor systems, microprocessor-based or programmable consumer electronics, minicomputers, mainframe computers, and the like. The disclosure may also be practiced in distributed computing environments where tasks are performed by remote processing devices that are linked through a communications network. In a distributed computing environment, program modules may be located in both local and remote computer-storage media including memory storage devices.

The central computing device, also referred to as a processor, may comprise or consist of a general-purpose computing device in the form of a computer including a processing unit, a system memory, and a system bus that couples various system components including the system memory to the processing unit. Computers typically include a variety of computer-readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by the processing unit. The data or program modules may include an operating system, application programs, other program modules, and program data. The operating system may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, the iOS operating system, the Android operating system, the Chrome operating system, an OPENSTEP operating system or another operating system or platform.

Any suitable programming language may be used to implement without undue experimentation the data-gathering and analytical functions described above. Illustratively, the programming language used may include assembly language, Ada, APL, Basic, C, C++, C*, COBOL, dBase, Forth, FORTRAN, Java, Modula-2, Pascal, Prolog, Python, Qt, REXX, and/or JavaScript for example. Further, it is not necessary that a single type of instruction or programming language be utilized in conjunction with the operation of the system and method of the invention. Rather, any number of different programming languages may be utilized as is necessary or desirable.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

The network over which communication takes place may include a wired or wireless local area network (LAN) and a wide area network (WAN), wireless personal area network (PAN) and/or other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Herein, reference to a computer-readable storage medium encompasses one or more non-transitory, tangible computer-readable storage-media possessing structure or structures. As an example and not by way of limitation, a computer-readable storage medium may include a semiconductor-based medium or other integrated circuit (IC), including but not limited to a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101.

The present disclosure encompasses all changes, substitutions, variations, alterations, and modifications to the example embodiments herein that a person having ordinary skill in the art would comprehend. Likewise, the appended claims encompass, where appropriate, all changes, substitutions, variations, alterations, and modifications to the example embodiments herein that a person having ordinary skill in the art would comprehend.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure. For example, although the foregoing embodiments have been described in the context of dashboarding tools with multi-directional connection of directed acyclic graphs, wherein the multi-directional connection is between dashboarding tools and external data tools, it will be apparent to one of ordinary skill in the art that the disclosure may be used with any dashboarding tools utilizing multiple external and internal DAGs where multi-direction connection is desirable. The disclosure is thus not limited to any particular type of communication system, network, protocol, format, or application.

Some portions of this description describe the embodiments of the disclosure in terms of algorithms and symbolic representations of operations on information. These algorithmic descriptions and representations are commonly used by those skilled in the dashboarding, data analytics, and data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, other code or location for code, or any combinations thereof.

Any of the steps, operations, methods, or processes described herein may be performed or implemented with one or more hardware or software modules, alone or in combination with other devices.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the invention, which is set forth in the following claims.

Certain aspects of the present disclosure were described above. From the foregoing it will be seen that this disclosure is one well adapted to attain all the ends and objects set forth above, together with other advantages, which are obvious and inherent to the system and method. It will be understood that certain features and sub-combinations are of utility and may be employed without reference to other features and sub-combinations. It is expressly noted that the present disclosure is not limited to those aspects described above, but rather the intention is that additions and modifications to what was expressly described herein are also included within the scope of the invention. Moreover, it is to be understood that the features of the various aspects described herein are not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the disclosure is not to be defined only by the preceding illustrative description.

Accordingly, what is claimed is:

1. A system for dashboarding tools with connection of directed acyclic graphs, the system comprising:
    an internal directed acyclic graph (DAG), representing a plurality of queries, a plurality of dependencies, and a plurality of data flow;
    a set of user-information on a plurality of users;
    a dashboarding tool, which maintains, displays and analyzes a data lineage; and
    a dashboard display;
    and wherein the system is configured to access a plurality of third-party DAGs which are stored in memory accessible to a plurality of external data engineering tools;
    and wherein the internal DAG is configured to connect with and remain communicably coupled, via at least one of a dependency and a reference point, with at least one third-party DAG of the plurality of third-party DAGs, allowing updates from the at least one third-party DAG to the internal DAG, and requests from the internal DAG to the at least one third-party DAG;
    and wherein (i) the system configured to access the plurality of third-party DAGs and (ii) the internal DAG being configured to connect with and remain communicably coupled, via the at least one of a dependency and a reference point, with the at least one third-party DAG, allows for the dashboarding tool to display a plurality of data that is moved, flowed, transformed, manipulated by, accessible by, or linked to the internal DAG and/or the at least one third-party DAG.

2. The system of claim 1, wherein the system allows the plurality of external data engineering tools to create or add to the plurality of third-party DAGs.

3. The system of claim 1, wherein the internal DAG comprises at least a first internal DAG and a second internal DAG.

4. The system of claim 1, wherein a user may build the internal DAG, or cause the system to build the internal DAG, through use of the dashboarding tool; and wherein the user can see the internal DAG.

5. The system of claim 1, wherein the system and the internal DAG are configured to identify inefficiencies in an execution order of the plurality of queries and redundancy in a query execution, before executing the plurality of queries in the query execution.

6. The system of claim 1, wherein the system allows processing or computing the plurality of queries before compile-time or runtime of the dashboarding tool; and wherein the plurality of queries is processed by one or more of the plurality of external data engineering tools as part of a data transformation batch process.

7. The system of claim 1, wherein the dashboarding tool provides a mechanism for exporting queries for inclusion into a given third-party DAG.

8. The system of claim 1, wherein the internal DAG can be exported to one or more of the plurality of third-party DAGs.

9. The system of claim 1, wherein using the dashboarding tool, a user is enabled to browse a third-party DAG, and select a plurality of dependencies between the third-party DAG and an internal DAG.

10. The system of claim 1, wherein the dashboarding tool is arranged and configured to inform a user of changes they make to any of third-party data models, third-party data stores, third-party data sources, third-party data warehouses, or third-party DAGs that affect or break the dashboard display.

11. The system of claim 1, wherein the system further comprises a plurality of modules, which comprise a DAG connector module, a DAG browser module, a query builder module, a query linker module, a lineage visualizer module, and a DAG exporter module, and wherein the DAG exporter module exports the internal DAG in a format configured to a format of the external data engineering tools, so that the internal DAG and the data contained in it may be used with any third-party DAG.

12. The system of claim 11, wherein a third-party DAG may be imported by the DAG connector module to create, or to add to, the internal DAG.

13. The system of claim 11, wherein the internal DAG may be exported by the DAG exporter module to create one or more new third-party DAGs.

14. The system of claim 1, wherein the internal DAG is arranged to be connectable to a third-party DAG with a plurality of reference points, that can be added by a user.

\* \* \* \* \*